(12) United States Patent
Mannes et al.

(10) Patent No.: US 6,576,088 B2
(45) Date of Patent: Jun. 10, 2003

(54) PROCESS FOR PREPARING DRY BROKE

(75) Inventors: Wolfgang Mannes, Ravensburg-Bavensdorf (DE); Manfred Kohrs, Ravensburg (DE)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/191,493

(22) Filed: Jul. 10, 2002

(65) Prior Publication Data

US 2003/0015610 A1 Jan. 23, 2003

(30) Foreign Application Priority Data

Jul. 21, 2001 (DE) ............................. 101 35 699

(51) Int. Cl.[7] ................................. D21F 1/66
(52) U.S. Cl. ........................... 162/191; 162/56
(58) Field of Search ........................ 162/191, 265, 162/264, 24, 25, 26, 28, 56; 241/21

(56) References Cited

U.S. PATENT DOCUMENTS 3,245,868 A * 4/1966 Espenmiller et al. ....... 162/191
5,084,135 A * 1/1992 Brooks et al. ............... 162/191
5,176,793 A * 1/1993 Kurtz ........................... 162/56
5,958,179 A * 9/1999 Gehr et al. .................... 162/56
6,126,787 A * 10/2000 Elijoki et al. ................ 162/265
6,267,847 B1 * 7/2001 Doelle et al. .................. 162/28
6,419,787 B2 * 7/2002 Goulet et al. ................ 162/191

FOREIGN PATENT DOCUMENTS

| DE | 4118412 | 12/1992 |
|----|---------|---------|
| DE | 19532301 | 3/1997 |
| EP | 0711369 | 6/1997 |
| EP | 0826471 | 3/1998 |

* cited by examiner

*Primary Examiner*—Peter Chin
(74) *Attorney, Agent, or Firm*—Greenblum & Bernstein, P.L.C.

(57) ABSTRACT

Process for preparing dry broke in one of a paper, cardboard or coating machine. The process includes diluting the dry broke to a consistency of between about 15 to 60%, and slushing the dry broke with shear forces sufficient to crush filler particles in the dry broke.

24 Claims, 2 Drawing Sheets

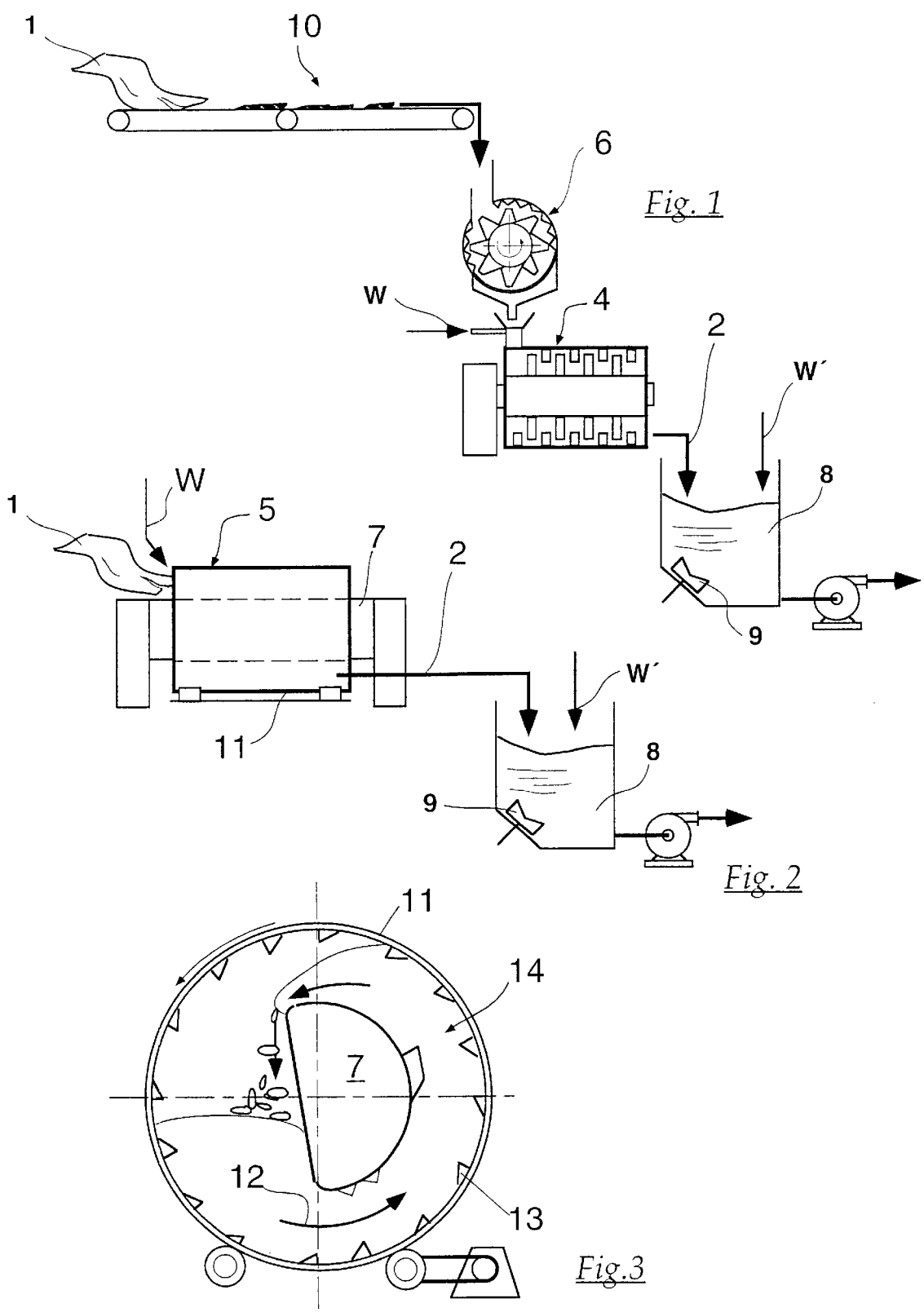

PROCESS FOR PREPARING DRY BROKE

CROSS-REFERENCE TO RELATED APPLICATIONS

The present application claims priority under 35 U.S.C. §119 of German Patent Application No. 101 35 699.4, filed on Jul. 21, 2001, the disclosure of which is expressly incorporated by reference herein in its entirety.

BACKGROUND OF THE INVENTION

1. Field of the Invention

The invention relates to a process for preparing dry broke of a paper, cardboard or coating machine.

2. Discussion of Background Information

It is known that operating conditions can occur with a paper or cardboard machine where the paper produced during paper production cannot be reeled as a finished web, but has to be removed from the area of the paper machine beforehand as a so-called broke. Something similar can also occur with coating machines in which the paper already produced and dried is provided with a layer called a coating. Even with trouble-free operation, material is constantly accumulating in the form of trimmings which have to be slushed and recirculated into the paper making process. Large amounts of dry broke can also occur during reeling or because certain quality demands of the finished paper were not met. As a rule, the material present as broke contains high-quality fibers and is sorted. It is usually crushed and suspended with water.

As a rule, dry broke is only slightly contaminated and is sorted. For these reasons, the emphasis in the reprocessing processes in the prior art is on the mechanical crushing of the already hardened paper web and its suspension in water. In addition to the actual paper fiber, dry broke also contains a relatively large number of mineral fillers. If dry broke is slushed from coated paper, they come to a considerable extent from the substance applied as coating composition. In general, these fillers should be used again for paper making. They can therefore remain at least in part in the recycled dry broke. The suspension obtained in this manner is then guided into the machine chest from which the stock is removed again to produce this paper grade.

A process is known from EP 0 711 369 B1 in which the filler-containing paper material is fractionated in a complicated manner in several steps in order to concentrate the fillers. They are subsequently dispersed and at least partially reused. DE 19532301 describes a process in which coated dry broke is first slushed and possibly cleaned and deflaked. After another thickening, it is also dispersed in a certain embodiment of the process. The process is complex and essentially aimed at treating the filtrates occurring during thickening.

SUMMARY OF THE INVENTION

The present invention provides a process with which it is possible to carry out the preparation of the dry broke without too great an expense or effort, thereby avoiding the problems that could arise due to the abundant fillers, in particular coating colors.

The present invention provides that the dry broke is slushed at a consistency of at least about 15% and no more than about 60% and is thereby mechanically processed by shear forces so that the filler particles contained therein are crushed.

The possibility of being able to process the resulting dry broke as a whole with high shear forces is particularly advantageous. Its consistency is already high enough from the outset, and its dirt content is minimal. Complex fractionating steps which presuppose a dilution can therefore be dispensed with as well as a subsequent thickening. The high shear forces are also mostly useful for treating the fibers contained in the dry broke, as they dissolve fiber lumps and activate the fiber surface, thus preparing for reuse in an optimal way.

The present invention is directed to a process for preparing dry broke in one of a paper, cardboard or coating machine. The process includes diluting the dry broke to a consistency of between about 15 to 60%, and slushing the dry broke with shear forces sufficient to crush filler particles in the dry broke.

According to a feature of the invention, the shear forces can be applied to the dry broke in a kneader pulper. Further, the kneader pulper can include a single-screw grinding machine operated at a solids content between about 20 and 50%. The single-screw grinding machine may include kneading tools, and the shear force can be applied by a mechanical process that includes moving the kneading tools relative to each other at a distance of at least about 10 mm at a speed of no more than about 15 m/sec.

In accordance with another feature of the invention, the dry broke may be slushed in one of a kneader pulper, a disk disperser, and a slushing drum.

Further, the shear forces can be applied to the dry broke in a slushing drum at a solids content of between about 20 and 50%.

According to still another feature of the invention, the shear forces can be applied to the dry broke in a rapid-action disk disperser at a solids content of between about 20 and 50%.

Still further, the shear forces can be produced at a stock temperature of below about 60° C.

In accordance with a further feature of the instant invention, a specific energy of at least about 80 kWh/t can be applied to the dry broke during slushing.

According to the invention, a majority of the dry broke can include coated paper and the fillers may include coating colors of the coated paper. The crushing of the fillers can prevent the coating colors from forming agglomerates that interfere with the reuse of the dry broke in the machine.

In accordance with the present invention, between formation of the dry broke and the slushing, the dry broke may not be mechanically processed.

Moreover, between formation of the dry broke and the slushing, the dry broke may not be thickened.

In accordance with a further feature of the invention, the dry broke can be composed of first and second dry broke, and the process may further include slushing the first dry broke into a pumpable suspension, diluting the second dry broke with the pumpable suspension, and jointly slushing the first and second dry broke with shear forces sufficient to crush the filler particles. The first dry broke can be formed under the machine. Further, the first dry broke may be substantially immediately slushed. The amount of first dry broke is less than the amount of second dry broke. Still further, a slusher may be located in direct proximity to the machine, and the process can further include slushing of the first dry broke in the slusher. The slusher may be located underneath the machine. Moreover, the machine can include a receiver vat, and the process may further include storing the pumpable suspension is in the receiver vat. The pumpable suspension can be produced with a consistency of between about 4 and 10%.

Between the formation of the dry broke and the slushing, the process can further include shredding the dry broke.

In accordance with yet another feature of the present invention, the shear forces can grind the filler particles to a grain size of not more than about 60 μm. Further, the shear forces may grind the filler particles to a grain size of not more than 40 μm.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1 and 2 illustrate two different embodiments of the process according to the invention;

FIG. 3 illustrates a slushing drum well suited to the process; and

DETAILED DESCRIPTION OF THE PRESENT INVENTION

Figure 4:
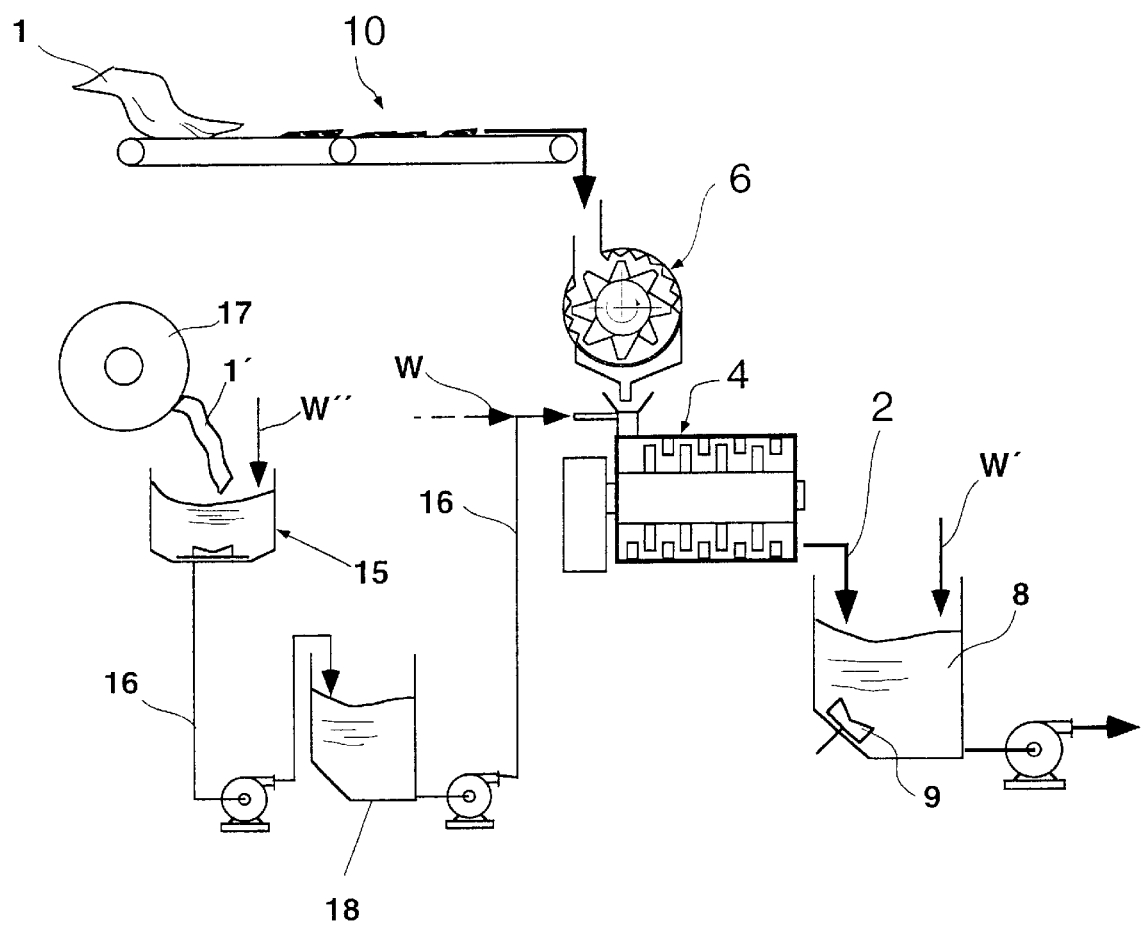
FIG. 4 illustrates another process variation.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The process design depicted in FIG. 1 shows that dry broke 1 is first removed via a transport system 10 from the area where it occurred, e.g., a paper machine (not shown). If it occurs in large webs, it can be expedient to break it up beforehand in a shredder 6 so that it can be fed into a kneader pulper 4. By adding (spraying and/or injecting) water W, it is brought to a consistency of between about 15 and about 60%, preferably about 25 to about 35% dry matter content. The necessary shear forces can then be applied. Here a kneader pulper 4 is used as the apparatus for this, in which it is known that kneading tools are moved past each other at a certain distance. High temperatures of over about 60° C. are not normally necessary for this purpose. A suitable kneader pulper is the single-screw grinding machine known per se with kneading tools which are moved relative to each other at a distance of at least about 10 mm and at a speed of no more than about 15 m/sec. However, rapid-action disk dispersers are also conceivable, which are preferably operated with a consistency of about 15 to about 50% and reach a relative speed of approximately 40 m/sec and more at their periphery.

As a result of intensive fiber-fiber friction, shear forces are produced which are large enough to break up the filler particles and grind them into fine fragments. A degree of fineness is achieved which is necessary for the paper to be made from it later. In general, this is a grain size of no more than about 60 μm, and, if possible, no more than 40 μm. In this regard, it is noted that at least a majority of the resulting dry broke includes coated paper, such that the coating colors, if not for the instant invention, would form agglomerates that would interfere with the reuse of the dry broke in the paper making process.

FIG. 2 shows another form of the process according to the invention in which, in contrast to FIG. 1, the apparatus producing the shear forces is a slushing drum 5. This can advantageously feature a stationary displacer. Such a drum is schematically illustrated in FIG. 3 in section with an axial view. It shows rotating (arrow 12) drum body 11, which, e.g., is provided with driver strips 13 on its internal contour and in the center of which displacer body 7 is located. Displacer body 7 can have, e.g., the cross section of a semicircle or a similar shape. Processing channel 14 forms between the bulging side of displacer body 7 and the internal contour of drum body 11. Such a processing channel is particularly well-suited to strengthening the shear forces. A slushing drum is very robust even in alternating operation and as a rule is easier to load with dry paper webs or rolls than, e.g., a kneader pulper or disk disperser. However, an upstream shredder might possibly be necessary here too.

Stock 2 dispersed by the mechanical processing described with regard to each of the embodiments of FIGS. 1 and 2 is diluted with more water W', to which end an agitator 9 can be used. It is then ready as supply 8 for the approach flow system of the paper machine.

In order to achieve the consistency suitable for slushing, water W can be added to dry broke 1, as already described. In general, prepared backwater from the paper machine is used for this purpose. However, a fibrous suspension, e.g., such as that formed in the slushing of dry broke, is also suitable. This can have a particular advantage, as FIG. 4 shows.

In particular, FIG. 4 shows that a part 1' of dry broke forms under paper machine 17 (shown in symbolic form only). Accordingly, an immediate slushing is desirable to avoid a longer dry transport in this narrow part of the paper machine. Considering the time as a whole, the amount of part 1' is much smaller than that from the other broke sources. This also applies when a large dry broke is formed within a short period in the case of, albeit rare, web breaks under the paper machine. Suspension 16 formed in slusher 15 by slushing part 1' with water W" can be collected in a vat receiver 18 and then be used directly for dilution before or during the above-mentioned mechanical processing of dry broke 1, which has not yet been slushed, so that part 1' is also prepared in a particularly advantageous manner according to the process. Even if part 1' is so large in amount that it has to be thickened before being added to the kneader pulper or the like, in order to achieve a sufficiently high consistency there, the apparatus necessary for this would be considerably smaller than that for thickening the entire (slushed) dry broke.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for preparing dry broke in one of a paper, cardboard or coating machine, comprising:

diluting the dry broke to a consistency of between about 15 to 60%; and slushing the dry broke with shear forces sufficient to crush filler particles in the dry broke.

2. The process in accordance with claim 1, wherein the shear forces are applied to the dry broke in a kneader pulper.

3. The process in accordance with claim 2, wherein the kneader pulper comprises a single-screw grinding machine operated at a solids content between about 20 and 50%.

4. The process in accordance with claim 3, wherein the single-screw grinding machine comprises kneading tools, and the shear force is applied by a mechanical process comprising moving the kneading tools relative to each other at a distance of at least about 10 mm at a speed of no more than about 15 m/sec.

5. The process in accordance with claim 1, wherein the dry broke is slushed in one of a kneader pulper, a disk disperser, and a slushing drum.

6. The process in accordance with claim 1, wherein the shear forces are applied to the dry broke in a slushing drum at a solids content of between about 20 and 50%.

7. The process in accordance with claim 1, wherein the shear forces are applied to the dry broke in a rapid-action disk disperser at a solids content of between about 20 and 50%.

8. The process in accordance with claim 1, wherein the shear forces are produced at a stock temperature of below about 60° C.

9. The process in accordance with claim 1, wherein a specific energy of at least about 80 kWh/t is applied to the dry broke during slushing.

10. The process in accordance with claim 1, wherein a majority of the dry broke comprises coated paper and the fillers comprise coating colors of the coated paper.

11. The process in accordance with claim 10, wherein the crushing of the fillers prevent the coating colors from forming agglomerates that interfere with the reuse of the dry broke in the machine.

12. The process in accordance with claim 1, wherein, between formation of the dry broke and the slushing, the dry broke is not mechanically processed.

13. The process in accordance with claim 1, wherein, between formation of the dry broke and the slushing, the dry broke is not thickened.

14. The process in accordance with claim 1, wherein the dry broke is composed of first and second dry broke, and the process further comprises:

slushing the first dry broke into a pumpable suspension;

diluting the second dry broke with the pumpable suspension; and jointly slushing the first and second dry broke with shear forces sufficient to crush the filler particles.

15. The process in accordance with claim 14, wherein the first dry broke is formed under the machine.

16. The process in accordance with claim 15, wherein the first dry broke is substantially immediately slushed.

17. The process in accordance with claim 14, wherein the amount of first dry broke is less than the amount of second dry broke.

18. The process in accordance with claim 14, wherein a slusher is located in direct proximity to the machine, and the process further comprises slushing of the first dry broke in the slusher.

19. The process in accordance with claim 18, wherein the slusher is located underneath the machine.

20. The process in accordance with claim 14, wherein the machine includes a receiver vat, and the process further comprises storing the pumpable suspension is in the receiver vat.

21. The process in accordance with claim 14, wherein the pumpable suspension is produced with a consistency of between about 4 and 10%.

22. The process in accordance with claim 1, wherein, between the formation of the dry broke and the slushing, the process further comprises shredding the dry broke.

23. The process in accordance with claim 1, wherein the shear forces grind the filler particles to a grain size of not more than about 60 $\mu$m.

24. The process in accordance with claim 23, wherein the shear forces grind the filler particles to a grain size of not more than 40 $\mu$m.

* * * * *